United States Patent
Perez et al.

(10) Patent No.: US 9,871,927 B2
(45) Date of Patent: Jan. 16, 2018

(54) COMPLEXITY AWARE CALL-STEERING STRATEGY IN HETEROGENEOUS HUMAN/MACHINE CALL-CENTER ENVIRONMENTS

(71) Applicant: Conduent Business Services, LLC, Dallas, TX (US)

(72) Inventors: Julien Perez, Grenoble (FR); Nicolas Monet, Montbonnot-Saint-Martin (FR)

(73) Assignee: Conduent Business Services, LLC, Dallas, TX (US)

( * ) Notice: Subject to any disclaimer, the term of this patent is extended or adjusted under 35 U.S.C. 154(b) by 177 days.

(21) Appl. No.: 15/005,133

(22) Filed: Jan. 25, 2016

(65) Prior Publication Data
US 2017/0214799 A1 Jul. 27, 2017

(51) Int. Cl.
*H04M 3/493* (2006.01)
*H04M 3/51* (2006.01)
*H04M 3/523* (2006.01)
*G06Q 10/10* (2012.01)
*G10L 15/22* (2006.01)

(52) U.S. Cl.
CPC .......... *H04M 3/5235* (2013.01); *G06Q 10/10* (2013.01); *G10L 15/22* (2013.01); *H04M 3/493* (2013.01); *H04M 3/4938* (2013.01); *H04M 3/5166* (2013.01)

(58) Field of Classification Search
CPC .. H04M 3/5235; H04M 3/493; H04M 3/5166; H04M 3/4938
See application file for complete search history.

(56) References Cited

U.S. PATENT DOCUMENTS

| 7,158,935 B1 * | 1/2007 | Gorin | H04M 3/4936 704/257 |
| 2003/0074187 A1 | 4/2003 | Aït-Mokhtar et al. | |
| 2004/0008828 A1 | 1/2004 | Coles et al. | |
| 2012/0089683 A1 * | 4/2012 | Griesmer | H04M 3/493 709/206 |
| 2014/0222426 A1 * | 8/2014 | Di Fabbrizio | G10L 15/22 704/243 |

OTHER PUBLICATIONS

U.S. Appl. No. 14/702,850, filed May 4, 2015, Dymetman, et al.
U.S. Appl. No. 14/733,60, filed Jun. 8, 2015, Lagos, et al.
U.S. Appl. No. 14/810,817, filed Jul. 28, 2015, Venkatapathy, et al.
U.S. Appl. No. 14/811,005, filed Jul. 8, 2015, Dymetman, et al.

(Continued)

*Primary Examiner* — Nafiz E Hoque
(74) *Attorney, Agent, or Firm* — Fay Sharpe LLP

(57) ABSTRACT

A method for routing calls suited to use in a call center includes receiving a call from a customer, extracting features from an utterance of the call, and, based on the extracted features, predicting a class and a complexity of a dialog to be conducted between the customer and an agent. With a routing model, a routing strategy is generated for steering the call to one of a plurality of types of agent (such as to a human or a virtual agent), based on the predicted class and complexity of the dialog and a cost assigned to the type of agent. A first of the plurality of types of agent is assigned a higher cost than a second of the types of agent. The routing strategy is output.

18 Claims, 3 Drawing Sheets

(56) References Cited

OTHER PUBLICATIONS

Aksin, et al., "The modern call center: A multi-disciplinary perspective on operations management research," Production and Operations Management, vol. 16(6), pp. 665-688 (2007).

Auer, et al., "Finite time analysis of the multiarmed bandit problem," Machine Learning, vol. 47, pp. 235-256 (2002).

Abbasi-Yadkori, et al., "Improved algorithms for linear stochastic bandits," Adv. in Neural Information Processing Systems (NIPS) vol. 24, pp. 2312-2320 (2011).

Bohus, Ph.D. Thesis: "Error awareness and recovery in task-oriented spoken dialog systems", pp. 1-49, Jan. 31, 2014.

Bylina, et al., "A Markovian model of a call center with time varying arrival rate and skill based routing," Computer Networks, pp. 26-27 (2009).

Bubeck, et al., "Regret analysis of stochastic and nonstochastic multi-armed bandit problems," Foundations and Trends in Machine Learning, vol. 5(1), pp. 1-122 (2012).

Bertsimas, et al., "Robust and data-driven approaches to call centers," European Journal of Operational Research, vol. 207(2), pp. 1072-1085 (2010).

Bousquet-Vernhettes, et al., "Recognition error handling by the speech understanding system to improve spoken dialogue systems," ISCA Tutorial and Research Workshop on Error Handling in Spoken Dialogue Systems, pp. 113-118 (2003).

Bassamboo, et al., "On a data-driven method for staffing large call centers," Operations Research, vol. 57(3), pp. 714-726 (2009).

Chan, et al., "Call center routing policies using call waiting and agent idle times," Manufacturing & Service Operations Management, vol. 16(4), pp. 544-560 (2014).

Nuance Communications, "Customer care solutions from nuance, call steering. Technical report," 1380 Willow Road, Menlo Park, CA 94025, 2015. http://www.nuance-media.eu/sites.default/files/pdf/Voice%20Biometrics%20-%20Solution%20Overview.pdf, pp. 1-12, downloaded Sep. 28, 2015.

Nuance Communications, "Nuance solutions for telecommunications carriers. Technical report," 1380 Willow Road, Menlo Park, CA 94025, pp. 1-8, downloaded from www.nuance.com/ucmprod/groups/enterprise/@web/@enus/documents/collateral/nd_005149.pdf on Apr. 5, 2016 (2015).

Filippi, et al., "Parametric bandits: The generalized linear case," Adv. in Neural Information Processing Syst. vol. 23, pp. 586-594 (2010).

Filisko, et al., "Error detection and recovery in spoken dialogue systems," Proc. Workshop on Spoken Language Understanding for Conversational Systems, pp. 31-38 (2004).

Gittins, "Bandit Processes and Dynamic Allocation Indices," Journal of the Royal Statistical Society, Series B (Methodological), vol. 4, No. 2, pp. 148-177 (1979).

Hakkani-Tür, et al., "Unsupervised and active learning in automatic speech recognition for call classification," ICASSP, pp. 429-432, IEEE (2004).

Haffner, et al., "Optimizing SVMs for complex call classification," ICASSP, pp. 632-635, IEEE (2003).

Khudyakov, et al., "Designing a call center with an IVR (interactive voice response)," Queueing Syst., vol. 66(3), pp. 215-237 (2010).

Kim, "Online call quality monitoring for automating agent-based call centers," Interspeech, pp. 130-133 (2007).

Koole, et al., "Queueing models of call centers: An introduction," Annals of Operations Research, vol. 113(1), pp. 41-59 (2002).

Koole, et al., "Approximate dynamic programming in multi-skill call centers," Proc. 2005 Winter Simulation Conference, pp. 576-583 (2005).

Langkilde, et al., "Automatic Prediction of Problematic Human-Computer Dialogue in 'How May I Help You?'", Proc. IEEE Workshop on Automatic Speech Recognition and Understanding, pp. 369-372 (1999).

L'Ecuyer, Modeling and optimization problems in contact centers, 3rd Int'l Conf. on Quantitative Evaluation of Systems, pp. 145-156 (2006).

Park, "Automatic call quality monitoring using cost-sensitive classification," Interspeech, pp. 3085-3088 (2011).

Park, et al., "Low-cost call type classification for contact center calls using partial transcripts," Interspeech, pp. 2739-2742 (2009).

Rusmevichientong, et al., "Linearly parameterized bandits," Math. Oper. Res, vol. 35(2), pp. 395-411 (2010).

Skantze, "Error Handling in Spoken Dialogue Systems, Managing Uncertainty, Grounding and Miscommunication," Doctoral Thesis, Stockholm Sweden, pp. 3-127 (2007).

Tsitsiklis, "A lemma on the multiarmed bandit problem," IEEE Transactions on Automatic Control, AC-31(6), pp. 576-577 (1986).

Uceda-Ponga, et al., "A misclassification reduction approach for automatic call routing," MICAI 2008: Advances in Artificial Intelligence, pp. 185-192 (2008).

Wallace, et al., "Comparing skill-based routing call center simulations using C programming and arena models," Proc. 37th Conf. on Winter Simulation, pp. 2636-2644 (2005).

Williams, et al., "Scaling POMDPs for spoken dialog management," IEEE Trans. on Audio, Speech & Language Processing, vol. 15(7), pp. 2116-2129 (2007).

Williams, et al., "Partially observable Markov decision processes for spoken dialog systems," Computer Speech & Language, vol. 21(2), pp. 393-422 (2007).

Young, et al., "POMDP-based statistical spoken dialog systems: A review," Proc. IEEE, vol. 101(5), pp. 1160-1179 (2013).

Zweig, et al., "Automated quality monitoring in the call center with ASR and maximum entropy," ICASSP, pp. 589-592, IEEE (2006).

* cited by examiner

COMPLEXITY AWARE CALL-STEERING STRATEGY IN HETEROGENEOUS HUMAN/MACHINE CALL-CENTER ENVIRONMENTS

BACKGROUND

The exemplary embodiment relates to call centers and finds particular application in connection with a system and method for steering incoming calls to a real or virtual agent based on an utterance of a customer.

Call centers are used by a variety of businesses and other organizations to assist a customer, such as an existing customer or prospective customer, by answering a query, completing a transaction, or the like. In a traditional call center, a number of agents may be available to conduct dialogues with customers. In an inbound call center, the dialogue is generally initiated by the customer by telephone. Such call centers tend to be labor-intensive and thus costly to run. Additionally, because of logistic and economic constraints, inbound call centers may be physically housed across several different locations, time zones, and countries.

A call center can be defined as a set of resources (persons and infrastructure), which enable the delivery of services via the telephone (Pierre L'Ecuyer, "Modeling and optimization problems in contact centers, 3rd Int'l Conf. on Quantitative Evaluation of Systems, pp. 145-156 (2006); Zeynep Aksin, et al., "The modern call center: A multi-disciplinary perspective on operations management research," Production and Operations Management, 16 (6):665-688 (2007); Wyean Chan, et al., "Call center routing policies using call waiting and agent idle times," Manufacturing & Service Operations Management, 16 (4):544-560 (2014)). Most call centers also support Interactive Voice Response (IVR) units (Polyna Khudyakov, et al., "Designing a call center with an IVR (interactive voice response)," Queueing Syst., 66 (3):215-237 (2010), which can be summarized as answering machines, including predefined and limited possibilities of interactions. Most major companies have organized their communication with customers via one or more call centers, either internally-managed or outsourced. Call centers are commonly identified along several dimensions: functionalities (help desk, emergency, telemarketing, information providers, etc.), capacity, geographic distribution (single vs. multi-location) and agents characteristics (low-skilled vs. highly-trained agents and single vs. multi-skilled agents).

Recently, near-automatic solutions of assistance through autonomous dialog platforms, called virtual agents, have been developed, which are made possible through advances in automatic speech recognition (ASR) and statistical dialog systems. See, Jason D. Williams, et al., "Partially observable Markov decision processes for spoken dialog systems," Computer Speech & Language, 21 (2):393-422 (2007); J. D. Williams, et al., "Scaling POMDPs for spoken dialog management," IEEE Trans. on Audio, Speech & Language Processing, 15 (7):2116-2129 (2007); Steve J. Young, et al., "POMDP-based statistical spoken dialog systems: A review," Proc. IEEE, 101 (5):1160-1179 (2013).

However, call centers often face varied demands, like question answering, transactional requests, and troubleshooting diagnostics. Developing automated systems to handle all of these demands is challenging. One way to address this could be to equip each virtual agent with a human-fallback capability, where difficult situations during the dialog would be automatically detected in order to re-route the calls to human agents. See, Edward Filisko, et al., "Error detection and recovery in spoken dialogue systems," Proc. Workshop On Spoken Language Understanding For Conversational Systems, pp. 31-38 (2004); Rolf Carlson, et al., "Error handling in spoken dialogue systems," Speech Communication, 45 (3):207-209 (2005); Caroline Bousquet-Vernhettes, et al., "Recognition error handling by the speech understanding system to improve spoken dialogue systems," ISCA Tutorial and Research Workshop on Error Handling in Spoken Dialogue Systems, pp. 113-118 (2003); Dan Bohus, Ph.D. Thesis: "error awareness and recovery in task-oriented spoken dialog systems" (2014).

Such solutions have several problems. In particular, detection of a situation where the automated dialog agent faces difficulty entails complex analysis of the actual dialogue and discourse structure to accurately assess the necessity of a human re-routing. Additionally, the re-routing of a call indicates a failure to the calling customer that could affect the customer's confidence in the overall call-center problem solving capability. The customer may become frustrated by having to repeat the same information to the human agent. In turn, the human agent may find it more difficult to conduct the dialogue than if the customer had been routed directly to the agent, particularly if the human agent has to spend time in analyzing the human-machine conversation which has already taken place, in order to be able to continue it.

It would be desirable, therefore, to integrate virtual and real (human) agents into a common operation, with real agents handling the inbound calls that are less suited to being handled by virtual agents. In order to organize such heterogeneous agent environments efficiently, it would be advantageous to minimize the probability of failure of virtual agent-handled calls by accurately assessing the nature and the complexity level of a given inbound call from the beginning of the customer dialogue while considering the cost of human handled calls. The calls could then be steered to the appropriate type of agent.

Automatic analysis and classification of calls in the context of call centers has been widely studied in the domain of quality monitoring, error detection and categorization. See, e.g., Patrick Haffner, et al., "Optimizing SVMs for complex call classification," ICASSP, pp. 632-635, IEEE (2003); Geoffrey Zweig, et al., "Automated quality monitoring in the call center with ASR and maximum entropy," ICASSP, pp. 589-592, IEEE (2006), Fernando Uceda-Ponga, et al., "A misclassification reduction approach for automatic call routing," MICAI 2008: Advances in Artificial Intelligence, pp. 185-192 (2008); Youngja Park, et al., "Low-cost call type classification for contact center calls using partial transcripts," INTERSPEECH, pp. 2739-2742 (2009); Dilek Hakkani-Tür, et al., "Unsupervised and active learning in automatic speech recognition for call classification," ICASSP, pp. 429-432, IEEE (2004). More broadly, operational research has used the context of call centers for scheduling and more generally resource allocation researches. Ger Koole, et al., "Queuing models of call centers: An introduction," Annals of Operations Research, 113 (1), 41-59 (2002); Zeynep Aksin, et al., "The modern call center: A multi-disciplinary perspective on operations management research," Production and Operations Management, 16 (6):665-688 (2007); Achal Bassamboo, et al., "On a data-driven method for staffing large call centers," Operations Research, 57 (3):714-726 (2009), also called staffing. Skill-based routing has also been largely studied in the domain of heterogeneous skilled human agent centers. Rodney B. Wallace, et al., "Comparing skill-based routing call center simulations using C programming and arena models," Proc. 37th Conf. on Winter Simulation, pp. 2636-2644

(2005); Ger Koole, et al., "Approximate dynamic programming in multi-skill call centers," Proc. 2005 Winter Simulation Conference, pp. 576-583 (2005); Jaroslaw Bylina, et al., "A Markovian model of a call center with time varying arrival rate and skill based routing," Computer Networks, pp. 26-33 (2009). In such a context, the main purpose is to optimize the utilization of the agents by considering their skills while routing the customer incoming calls to the most appropriate one. Content based call-steering has been studied in the domain of human populated customer care in order to assess the nature of inbound calls more efficiently.

However, none of these methods addresses steering of calls to real and virtual agents at the outset of the dialogue, before a failure of a virtual agent has occurred.

INCORPORATION BY REFERENCE

The following references, the disclosures of which are incorporated herein in their entireties by reference, relate generally to the customer care field:

U.S. Pub. No. 20120089683, published Apr. 12, 2012, entitled AUTOMATED ASSISTANCE FOR CUSTOMER CARE CHATS, by Stephen J. Griesmer, et al.

U.S. Pub. No. 20040008828, published Jan. 15, 2004, entitled DYNAMIC INFORMATION RETRIEVAL SYSTEM UTILIZING VOICE RECOGNITION, by Scott Coles, et al.

U.S. application Ser. No. 14/702,850, filed May 4, 2015, entitled METHOD AND SYSTEM FOR ASSISTING CONTACT CENTER AGENTS IN COMPOSING ELECTRONIC MAIL REPLIES, by Marc Dymetman, et al.

U.S. application Ser. No. 14/733,60, filed Jun. 8, 2015, entitled ONLINE DYNAMIC SOLUTION RETRIEVAL BASED ON AUTOMATIC KEYWORD SELECTION DURING CUSTOMER DIALOGUE, by Nikolaos Lagos, et al.

U.S. application Ser. No. 14/810,817, filed Jul. 28, 2015, entitled LEARNING GENERATION TEMPLATES FROM DIALOG TRANSCRIPTS, by Sriram Venkatapathy, et al.

U.S. application Ser. No. 14/811,005, filed Jul. 28, 2015, entitled A ROBUST REVERSIBLE FINITE-STATE APPROACH TO CONTEXTUAL GENERATION AND SEMANTIC PARSING, by Marc Dymetman, et al.

BRIEF DESCRIPTION

In accordance with one aspect of the exemplary embodiment, a method for routing calls includes receiving a call from a customer and extracting features from an utterance of the call. Based on the extracted features, a class and a complexity of a dialogue to be conducted between the customer and an agent are each predicted. With a routing model, a routing strategy is generated for steering the call to one of a plurality of types of agent, based on the predicted class and complexity of the dialogue and a cost assigned to the type of agent. A first of the plurality of types of agent is assigned a higher cost than a second of the types of agent. The routing strategy is output.

At least one of the extracting features, predicting the class and the complexity, and generating the routing strategy may be performed with a processor.

In accordance with another aspect of the exemplary embodiment, a system for routing calls includes a feature extraction component which extracts features from an utterance of a customer call. A call classification component predicts a class of a dialogue to be conducted between the customer and an agent, based on the extracted features. A call complexity component predicts a complexity of the dialogue to be conducted between the customer and the agent, based on the extracted features. A routing component generates a routing strategy for steering the call to one of a plurality of types of agent with a learned routing model. The routing strategy is based on the predicted class of the dialogue, the predicted complexity of the dialogue, and a cost assigned to each type of agent. A first of the plurality of types of agent is assigned a higher cost than a second of the types of agent. An output component outputs the routing strategy. A processor implements the components.

In accordance with another aspect of the exemplary embodiment, a method is provided for generating a system for routing calls among human and virtual agents in a call center, based on an estimate of success of a dialogue to be conducted with an agent. The method includes learning a dialogue class model for predicting a class of a dialogue to be conducted based on an utterance of a call, the learning being based on prior dialogues conducted between a respective customer and an agent that are annotated by class. A dialogue complexity model is learnt for predicting a complexity of the dialogue based on the utterance of the call, the learning being based on prior dialogues conducted between a respective customer and an agent that are annotated by complexity. A dialogue routing model is learnt which estimates a success of the dialogue to be conducted between a customer and an agent, when the agent is a human agent, and estimates success of a dialogue conducted between a customer and an agent, when the agent is a real agent. The estimates of success each are a respective function of a class predicted by the dialogue class model and a complexity predicted by the dialogue complexity model. A cost is assigned for weighting the virtual agents differently from the virtual agents, such that, when calls are received from customers, they can be routed among the real and virtual agents as a function of the estimates of success and the assigned cost.

One or more of the steps of the method may be performed with a processor.

DETAILED DESCRIPTION

Figure 1:
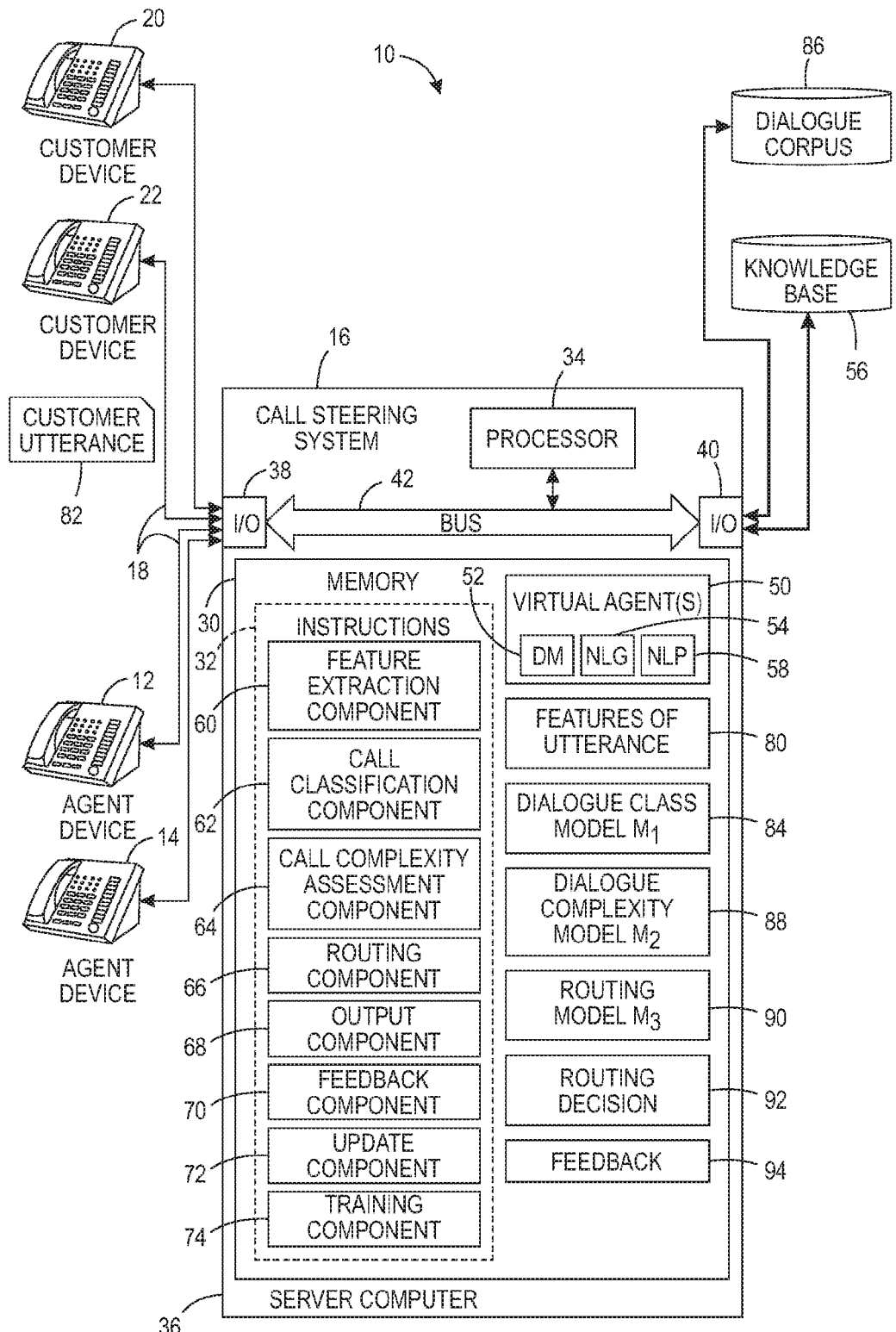
FIG. 1 is a functional block diagram of a network in which a call steering system operates.

Aspects of the exemplary embodiment related to an automated system and method of call-steering in a heterogeneous human/machine call center environment.

In the exemplary system and method, a category and a complexity estimation of an inbound call are each computed, based on the first (or a few) utterance(s) of a call-center customer (any person seeking assistance from the call center). The human/machine dispatch choice may be formalized as a multi-armed parametric bandit problem. For example, for two classes of agent, real and virtual, a 2-armed parametric bandit formulation may be used. The exemplary system combines natural language processing, a spectral method, and a logistic regression model of classification to assign type and complexity measurement to calls according to a set of features extracted from the first dialogue turn. Then, a sequential decision process is used in order to dispatch calls to human or automated agents based on the inferred class of the call, its inherent complexity, a feedback loop of the success of the calls and a cost associated with each agent type.

One objective of the exemplary system and method is to be able to handle mixed human/machine environments seamlessly in call-center activities. Customer care dialogues tend to be particularly heterogeneous by nature. This heterogeneity is linked to the type of call and the description of the problem provided by the calling customer. Due to the inherent limitation of dialog agents, it would be advantageous to be able to assign calls automatically to virtual agents when they can handle them, while frequently reassessing the capability of the virtual agent, based on a feedback loop supported by online monitoring of the success of the virtual agent handled calls.

The adaptive call-steering system described herein may be trained on a set of calls with associated annotations of the type of call. The complexity of a given call can be measured in terms of the number of turns required by a human agent to solve the customer request.

Call-steering in the exemplary heterogeneous human/machine environment may take into account (1) the estimated call type and complexity, (2) the agent's call type-dependent success rate, and (3) the agent's call type dependent cost, for both real and virtual agents.

Formalization of the human/machine call-steering strategy as a parametric bandit based on a machine learning-based approximation of the call type and complexity of a given dialog's opening, also called the first turn allows leveraging of methods such as a parametric upper confidence bounded search to implement a dynamic and cost aware call-steering strategy based on human and machine respective performances.

The dialog-complexity estimation based on an optionally-normalized measurement of the number of dialogue turns composing a dialogue that is used in support of the call-steering decision is simple to compute and provides an effective measure of this parameter.

This exemplary system and method are illustrated in the context of an inbound call center, which are designed to handle incoming traffic. In the context of customer care, the call center may provide question answering, perform transactional requests, or diagnose problems.

Dialogue corpora produced by human call center agents are used to classify the type of the call, to assess the complexity of the call based on features automatically extracted from the given dialog, and to provide a feedback loop in order to periodically and automatically re-assess the complexity of calls with regard to the success rate of the virtual agent calls and a predefined cost for each agent type (human or machine). This allows updating a routing model for determining routing of the calls.

With reference to FIG. 1, a call center network 10 includes a plurality of human agent communication devices 12, 14, each device being operated by a respective human agent. The human agent communication devices 12, 14 are communicatively connected with an automated call steering system 16, e.g., via wired or wireless links 18. The call steering system 16 receives inbound communications, e.g., phone calls, from a plurality of client communication devices 20, 22 operated by respective customers. The human agent communication devices 12, 14 and client communication devices 20, 22 may be telephones or other devices, such as computers, that are capable of receiving and transmitting voice communications. Or, they may be devices capable of receiving and outputting text, such as computers. For convenience, these devices will be referred to as agent and client phones.

Figure 2:
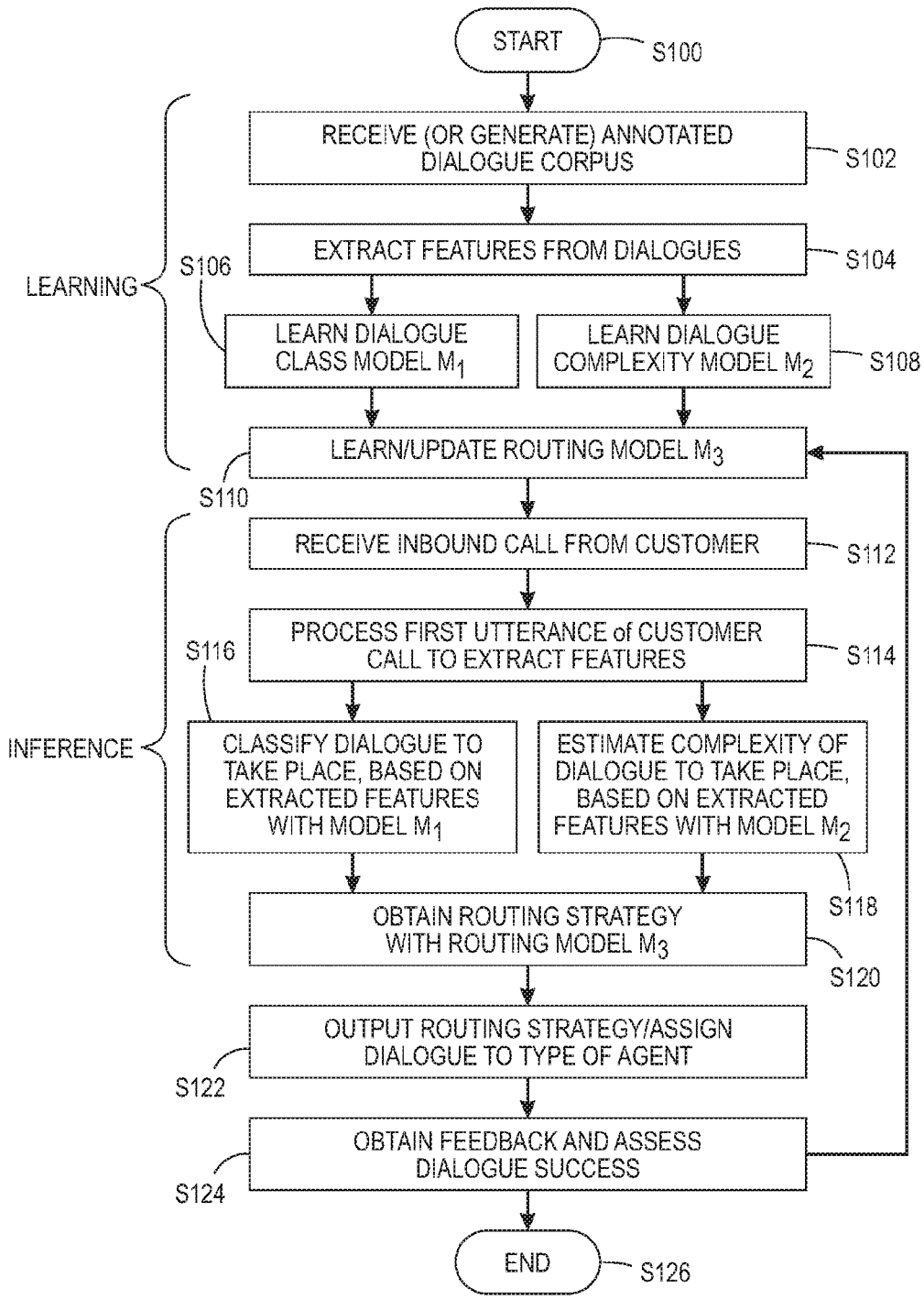
FIG. 2 is a flow chart illustrating a call steering method.

The system 16 includes memory 30 which includes instructions 32 for performing the exemplary method illustrated in FIG. 2 and a processor 34, in communication with the memory, for executing the instructions. The system may be hosted by one or more computing devices 36, such as the illustrated server computer, and may include one or more input/output devices 38, 40, for communication with external devices, such as the agent and client phones. Hardware components 30, 34, 38, 40 of the system may be communicatively connected by a data/control bus 42.

The system 16 includes or has access to one or more virtual agents 50. These are software components, which may be stored in memory 30 (or in remote memory accessible to the system 16). The virtual agents may be executed by the processor 34 (or by a separate processor, e.g., in communication with the remote memory). Each virtual agent 50 is configured to conduct a dialogue with a customer, which may be limited to a particular topic (e.g., a particular class of customer questions encountered by the call center). In conducting a dialogue with a customer, the virtual agent 50, like a real agent, participates in a number of turns, each turn including a customer utterance and an agent utterance, both utterances being in the form of human-recognizable speech (or text). Virtual agents of this type are described, for example, in above-mentioned U.S. application Ser. Nos. 14/810,817 and 14/811,005, incorporated herein by reference.

In an illustrative example, the virtual agent 50 may include a dialog manager (DM) 52, which has the responsibility of planning the content to be generated, given the state of the dialog. The DM communicates this information to a natural language generation (NLG) component 54 as content suggestions, referred to herein as dialog acts (DA). In this approach, a DA provides the substantive content to be conveyed by an agent utterance, including a communicative function (encoding the type of communication) also called the dialog act type (DA type); and content to be conveyed, which is suitably obtained from an associated knowledge base (KB) 56. Thus, in the call center dialogue context, the NLG component is only responsible for handling sentence planning and surface realization (that is, "translation" of the content suggested by the DM into a natural language utterance that may be "spoken" using a speech synthesizer. The virtual agent(s) may include or have access to a natural language processor, such as a parser 58 employing a suitable natural language grammar, which processes the inbound speech from the customer. Natural language parsers of this type are described, for example, in U.S. Pub. No. 20030074187, published Apr. 17, 2003, entitled NATURAL LANGUAGE PARSER, by Aït-Mokhtar, et al. In other embodiments, a reversible probabilistic model, able to perform both analysis and generation, as described in U.S. application Ser. No. 14/811,005, may be used for conversion of surface strings to logical forms and vice versa.

While the above are suitable ways for virtual agents 50 to be configured, it is to be appreciated that the virtual agents are not limited to any specific configuration and may be configured differently.

The instructions 32 include a feature extraction component 60, a call classification component 62, a call complexity assessment component 64, a routing component 66, an output component 68, a feedback component 70, an update component 72, and optionally a training component 74.

The feature extraction component 60 extracts a set of features 80 from an utterance 82 (e.g., the first customer utterance) of a customer call to be routed.

The classification component 62 uses a probabilistic call classification model 84, denoted $M_1$, to predict the type (class) of the customer call, based on the extracted features of the initial utterance 82. There may be a set of predefined classes, such as two, three, four, or more dialogue classes. The classification component 62 assigns the call to a single one of the predefined classes, based on the output of the model $M_1$, or computes a distribution over all classes. The model $M_1$ may have been learned by the training component 74 using features extracted from a corpus 86 of human-to-human customer care dialogues in a similar manner to the utterance features. Each of the dialogues in the corpus 86 is annotated with one of the classes of customer calls.

The call complexity assessment component 64 uses a probabilistic call complexity model 88, denoted $M_2$, to predict the complexity of the dialogue. The complexity may be assessed through an estimation of the number of turns of the dialogue by the model $M_2$. The model $M_2$.may have learnt on the same human-to-human corpus of customer care dialogues 86, or a different corpus of human-to-human corpus of customer care dialogues. The dialogues are each annotated with the respective number of turns. The number of turns in each dialogue may be computed automatically, e.g., if the utterances are labeled according to the speaker. As with the model $M_1$, the prediction is also based on extracted features 80 of the initial customer utterance, which may be the same set of features or a different set. For example, the model may learn which of the features are most highly correlated with the prediction and focus on those.

The routing component 66 computes a routing strategy for the customer call using a routing model 90, denoted $M_3$. The routing model generates a prediction of the success of the dialogue, which is based on the complexity and class predictions output by the components 62 and 64. Additionally, the routing model $M_3$ may consider a different cost for each of the types of agent, with the human agent generally being accorded a higher cost. The model $M_3$ may be formalized as a multi-armed parametric bandit problem, such as a 2-armed parametric bandit problem for two classes of agent, although more than two classes of agent may be used, such as virtual, real (lower level of expertise), and real (higher level of expertise). Any number of classes of agent can thus be employed, provided there is a way of partitioning the agents among the classes. The model $M_3$ may be learned by the training component 74, using success labels assigned to the dialogues in the corpus 86. As will be appreciated, separate training components may be employed for learning each of the models $M_1$, $M_2$, and $M_3$.

The output component 68 assigns the inbound call, which includes the utterance 82, to an agent (real or virtual), based on the computed routing strategy. The output component 68 may output a routing decision 92, which is sent to a call routing device (not shown).

The feedback component 70 derives feedback 94 on the success of the dialogue, e.g., after the dialogue is complete, and provides the feedback to the update component 72. The update component 72 updates the model $M_3$ based on the feedback 94.

The computer-implemented system 16 may include one or more computing devices 36, such as a PC, such as a desktop, a laptop, palmtop computer, portable digital assistant (PDA), server computer, cellular telephone, tablet computer, pager, combination thereof, or other computing device capable of executing instructions for performing the exemplary method.

The memory 30 may represent any type of non-transitory computer readable medium such as random access memory (RAM), read only memory (ROM), magnetic disk or tape, optical disk, flash memory, or holographic memory. In one embodiment, the memory 30 comprises a combination of random access memory and read only memory. In some embodiments, the processor 34 and memory 30 may be combined in a single chip. Memory 30 stores instructions for performing the exemplary method as well as the processed data.

The network interface 38, 40 allows the computer to communicate with other devices via a computer network, such as a local area network (LAN) or wide area network (WAN), or the internet, and may comprise a modulator/demodulator (MODEM) a router, a cable, and/or Ethernet port.

The digital processor device 34 can be variously embodied, such as by a single-core processor, a dual-core processor (or more generally by a multiple-core processor), a digital processor and cooperating math coprocessor, a digital controller, or the like. The digital processor 34, in addition to executing instructions 32 may also control the operation of the computer 36.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

FIG. 2 illustrates a method of call routing which may be performed with the exemplary system of FIG. 1. The method begins at S100.

At S102, access to an annotated dialogue corpus 86 is provided.

At S104, features 80 are extracted from each of the dialogues in the corpus 86, e.g., from only the first customer utterance in each dialog, by the feature extraction component 60.

At S106, a dialogue class model 84 is learned, by the training component 74, using the features 80 extracted at S104 and the class labels of the dialogues in the dialogue corpus. The learned model may be stored in memory 30.

At S108, a dialogue complexity model 84 is learned, by the training component 74, using the features 80 extracted at S104 and the labels representing the number of turns of the dialogues in the dialogue corpus. The learned model $M_2$ may be stored in memory 30.

At S110, a routing model $M_3$ is learned based on classes output by the the dialogue class model 84 and dialogue complexity assignments by the dialogue complexity model 84 for dialogues from the annotated corpus that are annotated with probability of success.

This ends the learning phase.

At S112, an utterance 82 of an inbound call is received.

At S114, the utterance 82 is processed by the feature extraction component to extract a set of features 80.

At S116, a class for the dialogue to be conducted is predicted, based on the features extracted from the utterance 82, by the call classification component 62, using the learned dialogue class model $M_1$.

At S118, a complexity of dialogue to be conducted is predicted, based on the features extracted from the utterance 82, by the call complexity component 64, using the learned dialogue complexity model $M_2$.

At S120, the learned routing model $M_3$ generates a routing strategy 92 for steering the call to a single one of a plurality of types of agent (e.g., to a virtual agent or human agent), as a function of the predicted class and predicted complexity, and also a cost associated with each type of agent. A first of the plurality of types of agent is assigned a higher cost than a second of the plurality agent types.

At S122, the dialogue is assigned (e.g., automatically) to a virtual agent or human agent, based on the routing strategy 82.

At S124, after the dialogue is complete, the success of the dialogue may be assessed, based on feedback.

The method may return to S110, where the routing model $M_3$ is updated based on the feedback. In some cases, one or more of the models $M_1$ and $M_2$ may also be updated.

The method ends at S126.

The method illustrated in FIG. 2 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 36, (for example, an internal hard drive of RAM), or may be separate (for example, an external hard drive operatively connected with the computer 36), or may be separate and accessed via a digital data network such as a local area network (LAN) or the Internet (for example, as a redundant array of inexpensive of independent disks (RAID) or other network server storage that is indirectly accessed by the computer 36, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 2, can be used to implement the method for call steering. As will be appreciated, while the steps of the method may all be computer implemented, in some embodiments one or more of the steps may be at least partially performed manually. As will also be appreciated, the steps of the method need not all proceed in the order illustrated and fewer, more, or different steps may be performed.

Further details of the system and method will now be described.

Corpus Annotation (S102)

The dialogues in the corpus 86 are annotated using a predefined set of dialogue classes. Common dialogue classes useful in the domain of customer care may include (1) Question Answering, (2) Transactional, (3) How-To and (4) Troubleshooting. However, any number and type of call-types can be considered as dialogue classes, depending on the context of the call-center. A hierarchical modeling of dialogue classes can also be employed.

The annotations of the dialogues in the corpus may be assigned manually, or using an automated annotation tool.

The dialogues in the corpus may each include a number of turns, each turn including a customer utterance and an agent utterance. The class labels may be applied based on a review of the entire dialogue or based on only a part of it, such as only the agent utterances.

Extraction of Features from Dialogues (S104)

The feature extraction process is linked to the representation of the dialogue that will be used as a support for type classification. For example, n-grams or a deeper representation of the dialogue based on parsing to assign parts of speech to the words may be employed. The (normalized) number of turns is computed on each dialogue as a measure of complexity.

In the exemplary embodiment, n-grams are used as features, each including a sequence of words. As an example, 1-to-4 grams are extracted from the first utterance of the dialogue. Thus, for example, for the utterance, "The browser on the smartphone won't work," the call classification component extracts the features: the (2); browser (1); on (1); smartphone (1); won't (1) work (1); the browser (1); browser on (1); on the (1); the smartphone (1); smartphone won't (1); won't work (1); the browser on (1); browser on the (1); on the smartphone (1); the smartphone won't (1); smartphone won't work (1); the browser on the (1); browser on the smartphone (1); on the smartphone won't (1); the smartphone won't work (1), where numbers in parentheses are the number of occurrences, although a binary presence/absence may alternatively be used. The extracted features may be expressed as a sparse vector of features having an element for each of the 1-4 grams previously found in the dialogue corpus 86. The feature vector may be normalized so that all the elements sum to a fixed value, such as 1.

The features are extracted from the customer utterance in the same manner, at S114.

Call-Type Classification (S116)

Call classification can be formalized as a n-class classification problem supported by features extracted from the first the turn of dialogue of a customer care situation.

A one-against-all logistic regression may be used as a parameterized model $M_1$ to assess the probability of a first customer turn d of a dialogue belonging to a class c. For example, the model may predict the class c according to Equation 1.

$$p_\theta(c \mid d) = \frac{1}{1 + e^{-(\theta_0^c + \theta_1^c \cdot \phi(d))}} \quad (1)$$

where $\varphi$ is a feature vector defined in $\{0,1\}^n$ with n being the size of the vocabulary composed of 1-to-4 grams, $\theta^c$ is a vector of parameters to learn for each dialogue class c and $\theta_0^c$ is a regularization vector. However, types of model may be employed, such as support vector machines (SVM), or the like.

Call-Complexity Estimation (S118)

The complexity modeling of a given dialogue with respect to its first utterance may be formalized as a regression task that aims to predict the normalized number of turns of the incoming dialog, when handled by a human agent. The correlation between the number of turns of a given dialogue and the overall complexity of the underlying call in the customer care situation has been previously studied and has been found useful for detecting critical situations. See, for example, Geoffrey Zweig, et al., "Automated quality monitoring in the call center with ASR and maximum entropy," ICASSP, pp. 589-592, IEEE (2006); Woosung Kim, "Online call quality monitoring for automating agent-based call centers," INTERSPEECH, pp. 130-133 (2007); Youngja Park, "Automatic call quality monitoring using cost-sensitive classification," INTERSPEECH, pp. 3085-3088 (2011). A large number of turns composing a dialogue is often an indicator of a complex troubleshooting situation. Additionally, the dialogue of inexperienced or language-challenging customers may be indicative that the call may take more turns and be unsuitable for a virtual agent trained predominantly on more comprehensible dialogues.

An exemplary model $M_1$ is a linear regression of the number of turns, l, with regard to a feature function of the user's first turn. The model may predict the complexity as shown in Equation 2.

$$\mathbb{E}(l \mid d) = \omega_0 + \omega_1 \cdot \varphi(d) \quad (2)$$

where $\varphi$ is the feature vector defined in $\{0,1\}^n$ being with n the size of the vocabulary composed of 1-to-4 grams, $\omega$ is a vector of parameters to learn, and $\omega_0$ is a regularization vector.

Complexity Aware Routing Strategy as Parametric 2-Armed Bandit (S120)

The call-steering strategy may be formalized as a parametric 2-armed bandit problem. See, for example, J. C. Gittins, "Multi-Armed Bandit Allocation Indices," John Wiley & Sons, 1989; J. N. Tsitsiklis, A lemma on the multiarmed bandit problem, IEEE Transactions on Automatic Control, AC-31 (6), pp. 576-577 (1986); Sarah Filippi, et al., "Parametric bandits: The generalized linear case," Adv. in Neural Information Processing Syst. 23, pp. 586-594 (2010), hereinafter "Filippi 2010"; Paat Rusmevichientong, et al., "Linearly parameterized bandits," Math. Oper. Res, 35 (2):395-411 (2010).

In an exemplary embodiment, the routing component uses a Generalized Linear Model of Upper Confidence bounded search as a solving policy, as proposed in Filippi 2010. With respect to the inferred descriptors of call-type t, the normalized call-complexity c and a predefined agent-type cost, a call i is routed to (1) a human or (2) an automated agent. In this framework, it is assumed that there is the capability of estimating the success of a given call, e.g., through automatic dialogue analysis (e.g., by statistical analysis of the dialogue or looking for certain words or phrases associated with successful calls) and/or active survey (e.g., asking the caller how successful the dialogue was, e.g., on a scale of 0 to 10, or a yes or no answer). The measure of success may thus be a binary value (0 or 1) or may be a value within a range (such as from 0 to 1). Automated techniques for determining success of a dialogue are described in Pei-Hao Su, et al., "Learning from Real Users: Rating Dialogue Success with Neural Networks for Reinforcement Learning in Spoken Dialogue Systems," Interspeech, pp. 2007-2011, 2015.

Given this information, the routing policy output by the model $M_3$ may be expressed as $\pi:\{t_i, c_i\} \to a_i$, where $a_i$ is a routing action, which may be a binary variable defining the recipient of the customer inquiry, e.g., a human or a virtual agent. This can be learned, for example, through stochastic gradient descent. See, for example, Yasin Abbasi-Yadkori, et al., "Improved algorithms for linear stochastic bandits," Adv. in Neural Information Processing Systems (NIPS) 24, pp. 2312-2320 (2011); Peter Auer, et al., "Finite time analysis of the multiarmed bandit problem," Machine Learning, 47, pp. 235-256 (2002); Séebastien Bubeck, et al., "Regret analysis of stochastic and nonstochastic multi-armed bandit problems," Foundations and Trends in Machine Learning, 5 (1):1-122 (2012).

A cost is associated with each type of agent. Since the probability of success of a human agent is generally higher than that of a virtual agent in any given situation, to prevent the bandit algorithm from converging to a "human only" call-steering strategy, a negative reward, also known as cost, $\lambda_j$ is associated to each type of agent j. This regulates the trade-off between success guarantee and the cost of call handling. The cost of the human is set lower than the cost of the virtual agent. The cost may be, for example, greater than 0, such as up to 1. For example, the parameter $\lambda_{human}=0.4$ and $\lambda_{virtual}=1.0$. These values may be assigned by a system designer, for example, based on the availability of human and virtual agents and/or the actual costs of each. Alternatively, they could be learned automatically by cross-validation. In some embodiments, the cost for human agents may be progressively increased, to progressively modify the call center to one which handles a higher proportion of calls using virtual agents.

The action $a_i$ is thus linked to a cost so that when the model decides to choose a human or virtual agent, a cost is assigned. The bound maximizes the trade-off between the probability (expectation) of success of giving the particular type of call with the particular estimation of the complexity to a specific agent which attempts to maximize the probability of success while minimizing the cost.

The exemplary model $M_3$ computes the expectation of success for the human agent and virtual agent, respectively, as a function of $t_i$ and $c_i$, e.g., according to Eqns. 3 and 4 (corresponding to the two arms of the bandit).

$$\mathbb{E}(s_{human} \mid t_i, c_i) = x_0 + x_1 t_i + x_2 c_i \quad (3)$$

$$\mathbb{E}(s_{virtual} \mid t_i, c_i) = y_0 + y_1 t_i + y_2 c_i \quad (4)$$

where $x_0$, $x_1$, $x_2$, $y_0$, $y_1$, $y_2$, are learned parameters. The expectation of success is then multiplied by the respective cost $\lambda$. Thus if the expectation of success is equal for a virtual agent and a human agent, the value $\mathbb{E}(s_{virtual} \mid t_i, c_i) \times \lambda_{virtual}$ will be higher and thus the model $M_3$ will assign the call to a virtual agent. In the feedback step (S124), each time a call is completed, the cost $\lambda$ is known (based on whether it was assigned to a human or virtual agent), and the estimate of success can be the measure of success, determined automatically or based on a survey. This information can be used to update the model $M_3$, by adjusting one or more of the learned parameters, so that the model gradually learns the optimal parameters to improve the routing decision.

Stochastic gradient descent can be used for the learning. The gradient (error) is the difference between the actual success and the expected success. The parameters of one of Eqns. 3 and 4 are adjusted to reduce the error.

The exemplary system and method enable call centers to transition from entirely human staffed call-center infrastructures to mixed human and virtual agent systems, and possibly to almost fully-automated dialog platforms of customer care services as feedback is provided to retrain the models of complexity assessment and call-routing strategy based on the customer first dialogue turn. The result is a predictive and dynamic complexity-based call steering strategy.

Without intending to limit the scope of the exemplary embodiment, the following examples demonstrate the applicability of the method to call steering in a call center.

EXAMPLES

The predictive call analysis and policy aspects have been implemented as a prototype.

The dataset used in the examples is composed of customer care dialogues that have been annotated according to class through an in-house annotation tool. The following classes are used for annotation:

1. Question Answering: Any information demand concerning a specification of a device, such as a telephone, or an associated service.
2. Transactional: Any demand concerning an action required by the customer to the call-center, like registering a customer or updating the contract terms of a customer.
3. How-To: Any demand concerning the need for the necessary sequence of instructions to perform a task on a given phone or a service provided by the associated corporation.
4. Troubleshooting: Any demand concerning the solving of a problem loosely expressed by a customer who does not necessarily have a full understanding of the device's current situation and so will require a diagnostic procedure.

The dialogues were manually annotated to estimate classification performance.

Table 1 shows the performance obtained in 10-fold cross-validated dialog-type classification with both one-against-all L1 regularized Logistic Regression models and a linear-SVM model.

TABLE 1

Classification performance Logistic Regression and SVM models based on the first user utterance of the dialog

| Class | F1 score - Logistic Reg. | F1 score - Linear SVM. |
|---|---|---|
| Transactional | 0.93 ± 0.05 | 0.85 ± 0.07 |
| Q&A | 0.81 ± 0.04 | 0.75 ± 0.06 |
| How-To | 0.80 ± 0.07 | 0.77 ± 0.07 |
| Troubleshoot | 0.75 ± 0.09 | 0.68 ± 0.08 |

This experiment demonstrated the reasonableness of using an automated method for annotating dialogues according to call type.

Table 2 shows the n-grams in the first utterance that are most/least correlated (with their associated parameter $\theta_i$) for each of the call type classifiers.

TABLE 2

Lists of the 10 most correlated and decorrelated n-grams for each call-type classifiers

| Model | Most Positively Correlated | Most Negatively Correlated |
|---|---|---|
| Transactional | register(2.250), product(1.307), to register(1.234), activated(0.889), please(0.855), up with(0.823), up for(0.804), are you(0.784), number(0.771), upgrade(0.767) | have(−1.456), how do(−1.274), what(−1.074), question(−0.798), know(−0.770), how to(−0.769), to know(−0.733), about(−0.726), reset(−0.590), does(−0.581) |
| Q&A | what(1.751), does(1.479), question(0.944), wondering(0.899), to know(0.895), is the(0.870), to know if(0.788), know if(0.788), does the(0.768), quick(0.679) | register(−1.345), how to(−1.263), how do(−1.212), need(−0.959), from(−0.777), to register(−0.745), please(−0.720), product(−0.693), set up(−0.629), that(−0.603) |
| How-To | how do(2.421), how to(1.974), how can(1.030), set up(1.024), reset(0.798), on my(0.713), know how(0.608), new phone(0.571), contacts(0.567), need to(0.517) | register(−1.190), product(−0.874), to register(−0.762), does(−0.750), with(−0.711), what(−0.669), [name of company] (−0.511), will(−0.500), sure(−0.427), having(−0.417) |
| Troubleshoot | having(0.957), with an(0.943), keeps(0.761), have an(0.688), how today(0.674), problem(0.629), have(0.608), working(0.576), says(0.553) | how do(−1.105), register(−1.030), what(−0.915), need to(−0.897), does(−0.781), wondering(−0.754), how to(−0.645), product(−0.610), to register(−0.597), how can(−0.575) |

Correlations, as illustrated above, can be used for identifying appropriate n-grams suitable for use as features, or the models may learn this automatically.

Table 3 shows the 10-fold cross-validated performance of the dialogue complexity forecasting based on the estimation of the dialogue length in normalized number of turns using linear regression with L1 regularization and different n-gram sizes.

TABLE 3

Complexity modeling performance of dialogues expressed
in normalized expected number of turns w.r.t the
first user utterance of the dialogue

| L.R. Model | Number Of Features | Mean Squared Error |
|---|---|---|
| 1-to-2 grams | 9201 | 0.2 ± 0.01 |
| 1-to-3 grams | 18806 | 0.1 ± 0.01 |
| 1-to-4 grams | 28960 | 0.3 ± 0.04 |

It appears for this data that 1-to-3 grams may be the most useful for predicting complexity.

Table 4 provides lists of the most/least correlated words for the complexity estimation model (Linear Regression with L1 Regularization) and their associated parameter $\theta_i$.

TABLE 4

Lists of the 15 most correlated and decorrelated
n-grams of the complexity estimation model

| Most Positively Correlated | Most Negatively Correlated |
|---|---|
| message (0.022), error (0.019), when (0.015), have (0.015), text (0.014), error message (0.013), and the (0.013), problem (0.012), try to (0.012), having (0.012) | register (−0.016), does (−0.011), wondering (−0.011), please (−0.011), to register (−0.008), up with (−0.008), does the (−0.008), what (−0.006), purchased (−0.006), activated (−0.005) |

Figure 3:
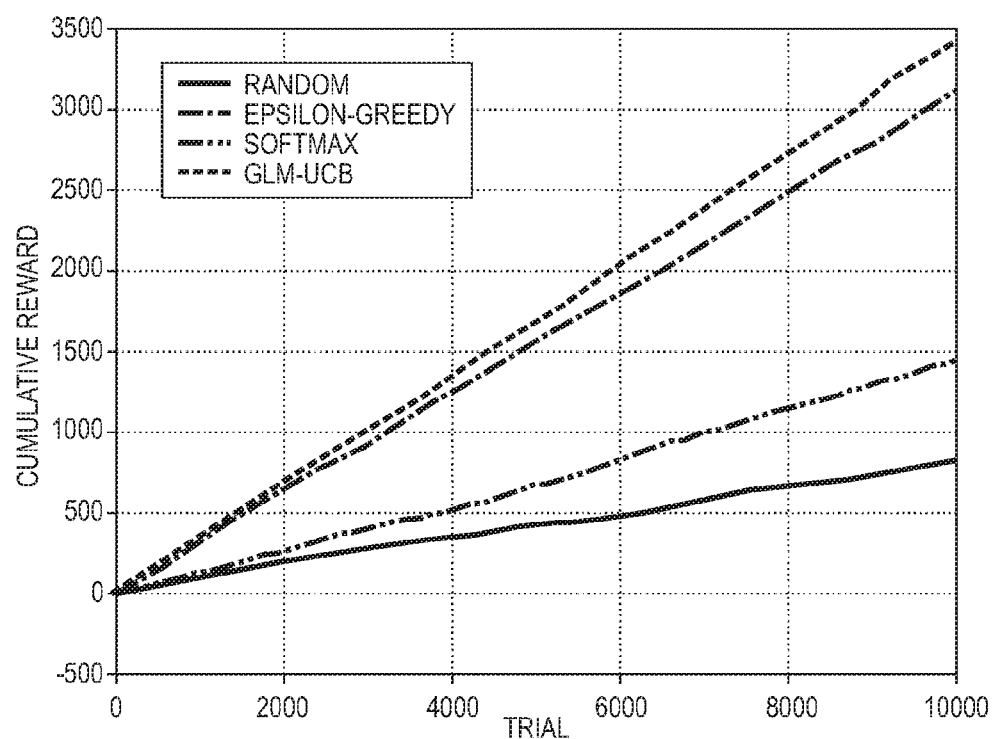
FIG. 3 is plot of cumulative reward vs number of trials for different 2-arm bandit models for parametric call-steering.

FIG. 3 shows performance results of a simulation of the 2-armed parametric bandit where the detection accuracy of the call-type and complexity have been simulated. Concerning the probability of success of a given call, the reward of each arm was assumed to follow a Bernouilli distribution of parameter p=($c_i$.$t_i$).$a_j$.$\lambda_j$, where $c_i \in [0,1]$ is the complexity estimation and $t_i \in [0,1]$ a parameter associated with the inferred type of a given call i. Then, $a_j \in [0,1]$ is a predefined parameter associated with the arm under consideration where $j \in \{1,2\}$. Such reward has the function of simulating the success rate of a given call w.r.t to its type t, its complexity estimation c and the actual call responder, machine or human, a. Finally, a cost associated with each responder type is assigned. Since the probability of success of a human can be considered higher than that of a machine in any given situation, to prevent the bandit algorithm from converging to a "human only" call-steering strategy, a negative reward, also known as cost, $\lambda_j$ is associated to each type of agent j. This last element is explicitly regulates the trade-off between success guarantee and the cost of call handling. Concerning the parameters for the bandit (1) the complexity estimation is drawn from Gaussian distributions. (2) the types are drawn using a confusion matrix produced from the performance of the classifier, (3) a is drawn from a Gaussian distribution and (4) the parameter $\lambda_{human}$=0.4 and $\lambda_{virtual}$=1.0.

The results show the feasibility of the decision model for a variety of two-arm bandit models: random, $\epsilon$-greedy, softmax, and Generalized Linear Model-Upper Confidence Bound (GLM-UCB). The GLM-UCB model, described in Filippi 2010, produced the highest cumulative reward of the models evaluated.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for routing calls comprising:
   receiving a call from a customer;
   extracting features from an utterance of the call;
   based on the extracted features, predicting a class and a complexity of a dialogue to be conducted between the customer and an agent, wherein the class c of the dialogue is computed according to Equation 1:

$$p_\theta(c \mid d) = \frac{1}{1 + e^{-(\theta_0^c + \theta_1^c \cdot \phi(d))}} \quad (1)$$

where $\phi(d)$ is a feature vector derived from the features extracted from the utterance d;
$\theta^c$ vector of parameters to learn for each dialogue class c; and
$\theta_0^c$ is a regularization vector;
with a routing model, generating a routing strategy for steering the call to one of a plurality of types of agent, based on the predicted class and complexity of the dialogue and a cost assigned to the type of agent, a first of the plurality of types of agent being assigned a higher cost than a second of the types of agent; and
outputting the routing strategy,
wherein at least one of the extracting features, predicting the class and the complexity, and generating the routing strategy is performed with a processor.

2. The method of claim 1, further comprising learning a dialogue class model based on a corpus of dialogues, each dialogue in the corpus being annotated with a class from a plurality of classes, the prediction of the class of the dialogue being performed with the dialogue class model.

3. The method of claim 1, further comprising learning a dialogue complexity model based on a corpus of dialogues, each dialogue in the corpus being annotated with a respective complexity, the prediction of the complexity of the dialogue being performed with the dialogue complexity model.

4. The method of claim 3, wherein the complexity is a function of a number of turns in the dialogue.

5. The method of claim 1, wherein the extracted features comprise n-grams.

6. The method of claim 1, wherein the routing model computes an expectation of success of the dialogue for each of the types of agent, based on the predicted class and complexity of the dialogue, and computes the routing strategy as function of the expectation of success and the assigned cost for each type of agent.

7. The method of claim 6, further comprising, after the dialogue has been conducted:
assessing a success of the dialogue;
computing a difference between the expectation of success, computed by the routing model for the type of agent to which the call has been routed, and the assessed success; and
updating the routing model to reduce the difference.

8. The method of claim 7, wherein the assessment of the success of the dialogue is based on at least one of:
a statistical analysis of at least part of the dialogue; and
customer feedback.

9. The method of claim 1, further comprising assigning the call to an agent based on the routing strategy.

10. The method of claim 1, wherein a first of the types of agent is a human agent and a second of the types of agent is a virtual agent.

11. The method of claim 1, wherein the method includes routing multiple calls from customers among human and virtual agents based on a respective routing strategy for each of the calls.

12. A system comprising memory which stores instructions for performing the method of claim 1 and a processor in communication with the memory for executing the instructions.

13. A computer program product comprising a non-transitory recording medium storing instructions, which when executed on a computer, causes the computer to perform the method of claim 1.

14. A method for routing calls comprising:
receiving a call from a customer;
extracting features from an utterance of the call;
based on the extracted features, predicting a class and a complexity of a dialogue to be conducted between the customer and an agent, wherein the complexity l of the dialogue is predicted according to Equation (2):

$$\mathbb{E}(l|d) + \omega_0 + \omega_1 \cdot \varphi(d) \quad (2)$$

where $\varphi(d)$ is a feature vector derived from the features extracted from the utterance d;
$\omega$ is a vector of parameters to learn; and
$\omega_0$ is a regularization vector;
with a routing model, generating a routing strategy for steering the call to one of a plurality of types of agent, based on the predicted class and complexity of the dialogue and a cost assigned to the type of agent, a first of the plurality of types of agent being assigned a higher cost than a second of the types of agent; and
outputting the routing strategy,
wherein at least one of the extracting features, predicting the class and the complexity, and generating the routing strategy is performed with a processor.

15. The method of claim 14, wherein the class c of the dialogue is computed according to Equation 1:

$$p_\theta(c|d) = \frac{1}{1 + e^{-(\theta_0^c + \theta_1^c \cdot \phi(d))}} \quad (1)$$

where $\varphi(d)$ is a feature vector derived from the features extracted from the utterance d;
$\theta^c$ vector of parameters to learn for each dialogue class c; and
$\theta_0^c$ is a regularization vector.

16. A system for routing calls comprising:
a feature extraction component which extracts features from an utterance of a customer call;
a call classification component which predicts a class of a dialogue to be conducted between the customer and an agent, based on the extracted features;
a call complexity component which predicts a complexity of the dialogue to be conducted between the customer and the agent, based on the extracted features;
a routing component which generates a routing strategy for steering the call to one of a plurality of types of agent with a learned routing model, the routing strategy being based on the predicted class of the dialogue, the predicted complexity of the dialogue, and a cost assigned to each type of agent, a first of the plurality of types of agent being assigned a higher cost than a second of the types of agent, wherein the routing model computes an expectation of success of the dialogue for each of the types of agent, based on the predicted class and complexity of the dialogue, and computes the routing strategy as function of the expectation of success and the assigned cost for each type of agent;
an output component which outputs the routing strategy;
a feedback component which assesses a success of the dialogue, based on feedback;
an update component which updates the routing model, including:
computing a difference between the expectation of success, computed by the routing model for the type of agent to which the call has been routed, and the assessed success; and
updating the routing model to reduce the difference; and
a processor which implements the components.

17. The system of claim 16, further comprising a virtual agent configured for conducting a dialogue with a customer.

18. A method for generating a system for routing calls among human and virtual agents in a call center, based on an estimate of success of a dialogue to be conducted with an agent, comprising:
learning a dialogue class model for predicting a class of a dialogue to be conducted based on an utterance of a call, the learning being based on prior dialogues conducted between a respective customer and an agent that are annotated by class;
learning a dialogue complexity model for predicting a complexity of the dialogue based on the utterance of the call, the learning being based on prior dialogues conducted between a respective customer and an agent that are annotated by complexity;
learning a dialogue routing model which computes an expectation of a success of the dialogue to be conducted between a customer and an agent, when the agent is a virtual agent, and computes an expectation of success of a dialogue conducted between a customer and an agent, when the agent is a real agent, the expectations of success each being a respective function of a class predicted by the dialogue class model and a complexity predicted by the dialogue complexity model;
assigning a cost for weighting the real agents differently from the virtual agents, whereby when calls are received from customers, they are routed among the real and virtual agents as a function of the expectations of success and the assigned cost;

after a dialogue has been conducted:
  assessing a success of the dialogue based on feedback;
  computing a difference between the expectation of success, computed by the routing model for a type of agent to which the call has been routed, and the assessed success; and
  updating the routing model to reduce the difference.

* * * * *